(12) United States Patent
Patel et al.

(10) Patent No.: US 7,119,944 B2
(45) Date of Patent: Oct. 10, 2006

(54) MICROMIRROR DEVICE AND METHOD FOR MAKING THE SAME

(75) Inventors: Satyadev Patel, Palo Alto, CA (US); Andrew Huibers, Palo Alto, CA (US); Jonathan Doan, Mountain View, CA (US); James Dunphy, San Jose, CA (US); Dmitri Simonian, Sunnyvale, CA (US); Hongqin Shi, San Jose, CA (US); Jianglong Zhang, Sunnyvale, CA (US)

(73) Assignee: Reflectivity, Inc., Sunnyvale, CA (US)

( * ) Notice: Subject to any disclaimer, the term of this patent is extended or adjusted under 35 U.S.C. 154(b) by 53 days.

(21) Appl. No.: 11/056,727

(22) Filed: Feb. 11, 2005

(65) Prior Publication Data
US 2006/0056005 A1 Mar. 16, 2006

Related U.S. Application Data

(63) Continuation-in-part of application No. 10/927,560, filed on Aug. 25, 2004, now Pat. No. 6,980,349.

(51) Int. Cl.
*G02B 26/00* (2006.01)
(52) U.S. Cl. ..................... 359/291; 359/224
(58) Field of Classification Search ........ 359/291, 359/292, 293, 295, 298, 214, 220, 222, 223, 359/224, 230, 320, 322
See application file for complete search history.

(56) References Cited

U.S. PATENT DOCUMENTS

| | | | |
|---|---|---|---|
| 5,835,256 A * | 11/1998 | Huibers | 359/291 |
| 5,999,306 A | 12/1999 | Atobe | |
| 6,028,690 A | 2/2000 | Carter et al. | |
| 6,522,454 B1 | 2/2003 | Meier et al. | |
| 6,523,961 B1 | 2/2003 | Ilkov et al. | |
| 6,798,561 B1 * | 9/2004 | Huibers | 359/291 |
| 2002/0024641 A1 | 2/2002 | Ilkov et al. | |
| 2004/0004753 A1 | 1/2004 | Pan | |
| 2004/0214350 A1 | 10/2004 | Pan et al. | |
| 2004/0240033 A1 | 12/2004 | Pan et al. | |

FOREIGN PATENT DOCUMENTS

| | | |
|---|---|---|
| WO | WO 2004/000720 | 12/2003 |
| WO | WO 2004/001487 | 12/2003 |
| WO | WO 2004/001717 | 12/2003 |
| WO | WO 2004/109363 | 12/2004 |
| WO | WO 2004/109364 | 12/2004 |

* cited by examiner

*Primary Examiner*—Hung X. Dang
*Assistant Examiner*—Tuyen Tra

(57) ABSTRACT

Disclosed herein is a micromirror device having in-plane deformable hinge to which a deflectable and reflective mirror plate is attached. The mirror plate rotates to different angles in response to an electrostatic field established between the mirror plate and an addressing electrode associated with the mirror plate.

38 Claims, 10 Drawing Sheets

MICROMIRROR DEVICE AND METHOD FOR MAKING THE SAME

CROSS-REFERENCE TO RELATED PATENT APPLICATIONS

This patent application is a continuation-in-part of U.S. patent application Ser. No. 10/927,560 filed Aug. 25, 2004, now U.S. Pat. No. 6,980,349, the subject matter being incorporated herein by reference.

TECHNICAL FIELD OF THE INVENTION

The present invention is related generally to art of microelectromechanical devices, and, more particularly, to micromirror devices.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

A SLM in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar SLM incorporating a two-dimensional array is described by Hartstein and Peterson, U.S. Pat. No. 4,229,732. Although the switching voltage of this SLM is lowered by connecting the deflectable mirror elements at only one corner, the device has low light efficiency due to the small fractional active area. In addition, diffraction from the addressing circuitry lowers the contrast ratio (modulation depth) of the display. A silicon-based micro-mechanical SLM with a large fractional optically active area is the Digital Mirror Device (DMD), developed by Texas Instruments and described by Hornbeck, U.S. Pat. No. 5,216,537 and other references.

Therefore, what is needed is a spatial light modulator that has a high resolution, a high fill factor, and a high contrast ratio.

SUMMARY OF THE INVENTION

In view of the foregoing, the present invention provides a micromirror device with an in-plane deformable hinge. The objects and advantages of the present invention will be obvious, and in part appear hereafter and are accomplished by the present invention. Such objects of the invention are achieved in the features of the independent claims attached hereto. Preferred embodiments are characterized in the dependent claims.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4b illustrates an exploded cross-section view of a micromirror at an OFF state in the spatial light modulator of FIG. 4a;

FIG. 4c illustrates an exploded cross-section view of a micromirror at an ON state in the spatial light modulator of FIG. 4a;

DETAILED DESCRIPTION OF THE INVENTION

The micromirror device of the present invention comprises a deflectable and reflective mirror plate that is connected to a deformable hinge located in the same plane as the mirror plate. The mirror plate is operable to rotate at a rotation axis that is parallel to but offset from a diagonal of the mirror plate or, is parallel to but offset from an in-plane symmetric axis of the mirror plate. In either configuration, the rotation axis, as well as the deformable hinge may or may not be disposed at an edge of the deflectable and reflective mirror plate.

The deformable hinge is connected to and held by non-deflectable posts above the addressing electrode so as to maintain a desired distance between the mirror plate and addressing electrode. The mirror plate is connected to the posts via the deformable hinge. The frame, hinge, and mirror plate is preferably, but not required, fabricated from the same substrate, such as a single crystal that is transmissive to visible light. The mirror plate may have a reflective surface coated with a material for efficiently reflecting visible light, particularly, a metallic material with high reflectivity to visible light.

For deflecting the mirror plate with, for example, an electrostatic force derived from an electrostatic field, an addressing electrode in connection with a memory cell is disposed proximate to the mirror plate. Such addressing electrode can be formed on a separate substrate, such as a semiconductor substrate. The distance, which predominantly determines the strength of the electrostatic force applied to the mirror plate with other parameters given, is maintained by the height of the posts.

The micromirror device of the present invention can be implemented in many applications, such as display systems, optical switches and other information optical information processing and storing systems. In the following, the present invention will be discussed with reference to micromirror devices for use in display systems. It will be appreciated by those skilled in the art that the following discussion is for demonstration purposes only, and should be interpreted as a limitation. Rather, other variations without departing from the spirit of the invention are also applicable.

Figure 1:
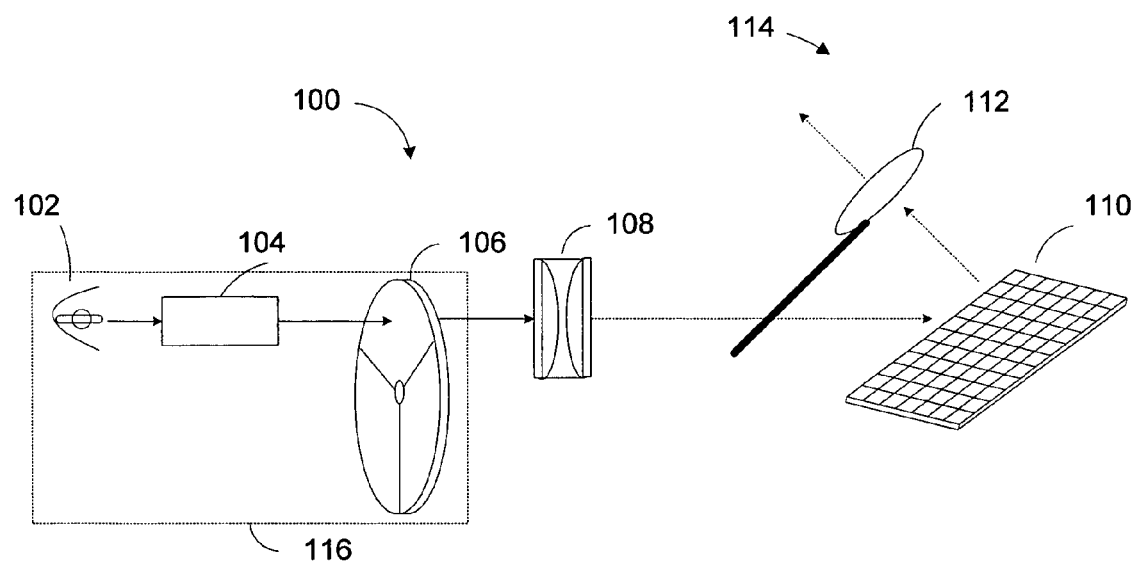
FIG. 1 demonstratively illustrates a display system in which embodiments of the invention can be implemented.

Turning to the drawings, an exemplar micromirror based display system is illustrated in FIG. 1. In its basic configuration, display system 100 comprises illumination system 116 for producing sequential color light, spatial light modulator 110, optical element 108 for directing illumination light from the illumination system onto the spatial light modulator, and optical element 112 that projects the reflected illumination light onto display target 114.

Illumination system 101 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure. More complex display systems are also applicable, especially those having more than one spatial light modulator for color images, such as the display system in FIG. 2.

Figure 2:
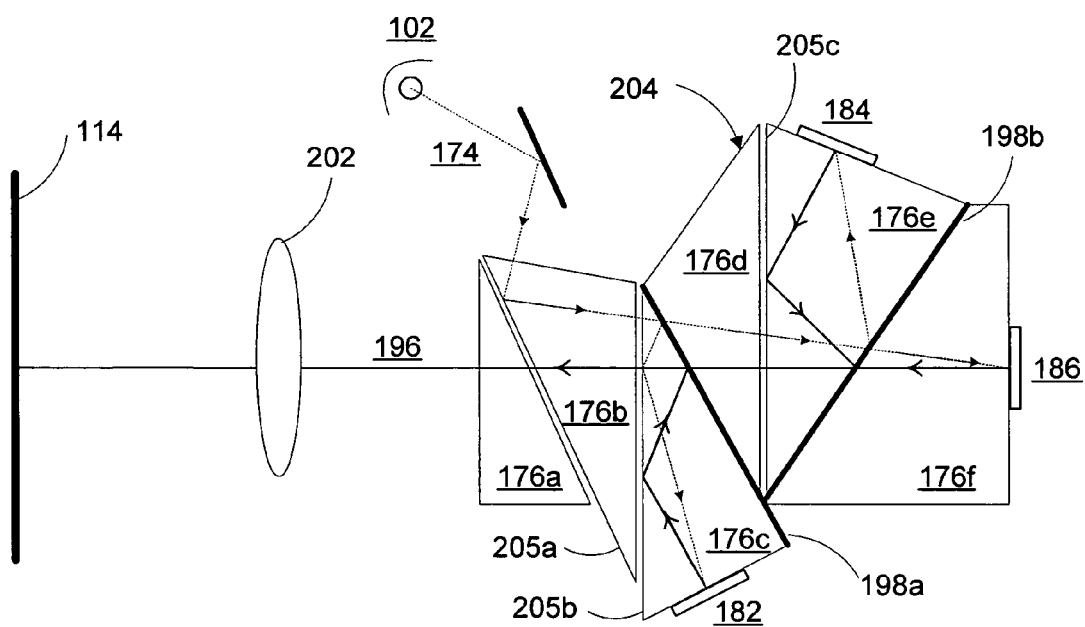
FIG. 2 demonstratively illustrates another display system in which embodiments of the invention can be implemented.

Referring to FIG. 2, another exemplary display system employing three spatial light modulators, each comprising an array of micromirrors and being designated for respectively modulating the multi-color (e.g. three color such as red, green and blue) light beams, is presented therein. The display system employs a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a, 205b and 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green and blue lights can be properly modulated. The modulated red, green and blue lights are recollected and delivered onto display target 114 through optic elements, such as projection lens 202, if necessary.

The spatial light modulator, in general, comprises an array of hundreds, thousands or millions of micromirrors, the total number of which determines the resolution of the displayed images. For example, the micromirror array of the spatial light modulator may have 1024×768, 1280×720, 1400× 1050, 1600×1200, 1920×1080, or even larger number of micromirrors. In other applications, such as optical switching, the micromirror array may have less number of micromirrors.

Figure 3:
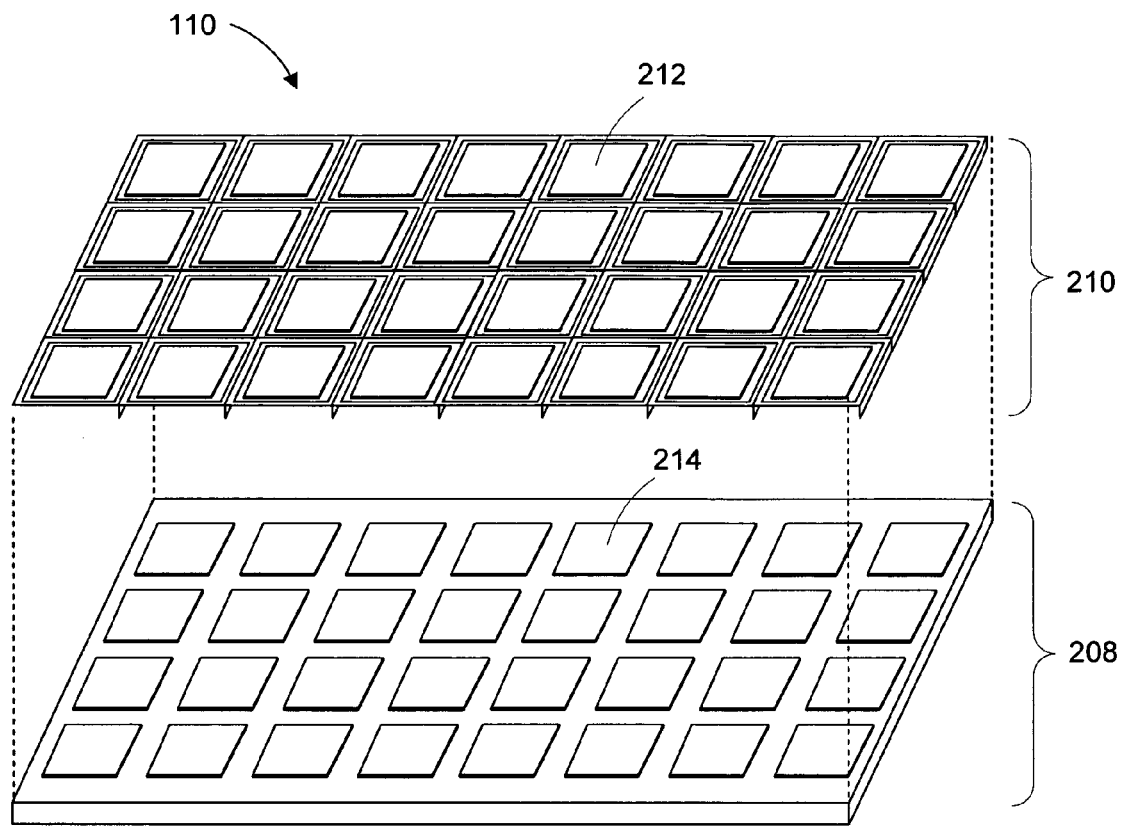
FIG. 3 demonstratively illustrates the spatial light modulator of FIG. 1 or FIG. 2 having a micromirror substrate and an addressing electrode substrate before bonding.

FIG. 3 illustrates a perspective view of the spatial light modulator having micromirror substrate 210 and addressing electrode substrate 208 before being bonded together. The micromirror substrate comprises an array of micromirrors each having a deflectable and reflective mirror plate; and the addressing electrode substrate comprises an array of addressing electrodes each being associated with one mirror plate of the micromirror array for deflecting the mirror plate. For simplicity purposes, only 8×4 micromirrors are presented therein. Formed on the addressing electrode substrate is also an array of circuits, such as memory cells, each having a voltage output node connected to the addressing electrode such that the voltage on the addressing electrode can be controlled according to the voltage signal stored in the memory cell. In accordance with an embodiment of the invention, each mirror plate is associated with one addressing electrode.

For achieving a high resolution and optical efficiency while maintaining the same dimension of the micromirror array so as to be compatible with commonly used light source, such as arc lamps which often has small arc sizes (e.g. 11.0 mm or shorter), the micromirror array preferably has certain dimensions as set forth ion U.S. patent application Ser. No. 10/627,303 filed Jul. 29, 2003, the subject matter being incorporated herein by reference. For example, the micromirror array preferably has a pitch of 10.16 micrometers or less or from 4.38 to 10.16 micrometers with the pitch defined as the distance between adjacent micromirrors in the micromirror array. The gap between adjacent micromirrors is preferably 0.5 micrometers or less, or from 0.1 to 0.5 micrometer.

Figure 4A:
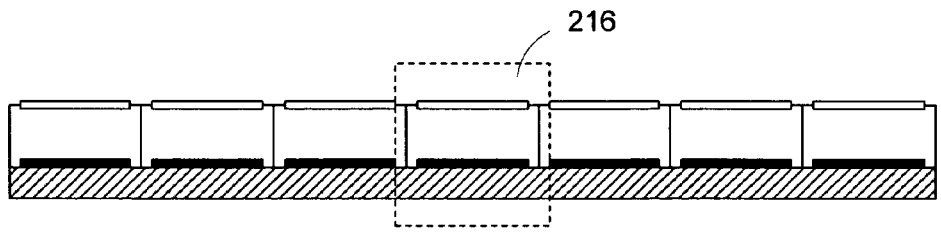
FIG. 4a is a simplified cross-section view of the spatial light modulator in FIG. 1 or FIG. 2.

A cross-section view of the bonded micromirror substrate and addressing electrode substrate is illustrated in FIG. 4*a*. Referring to FIG. 4*a*, the bonded micromirror substrate and addressing electrode substrate form an array of micromirror devices, such as micromirror device 216. Each micromirror device (e.g. micromirror device 216) comprises a deflectable and reflective mirror plate and an addressing electrode for deflecting the mirror plate. The mirror plate and the addressing electrode are spaced so as to allow the mirror plate to rotate above the addressing electrode. The distance between the mirror plate and addressing electrode is maintained by posts that are connected to the deformable hinge. The micromirror device of the micromirror array is better illustrated in FIG. 4*b*.

Figure 4B:
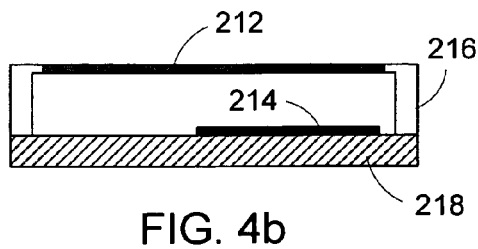

Referring to FIG. 4*b*, an exploded cross-section view of micromirror 216 is illustrated therein. Deflectable and reflective mirror plate 212 is held by posts 216 that is bonded to substrate 218, on which addressing electrode 214 is formed. The height of the posts is determined according to the desired electrostatic force for rotating the mirror plate to and ON or OFF state, which will be discussed in particular examples with reference to FIG. 5*a* through 5*d*.

Figure 4C:
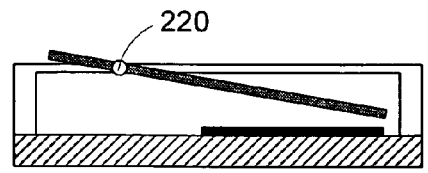

In accordance with one embodiment of the invention, the mirror plate is operable to rotate asymmetrically—that is, the maximum angle can the mirror plate rotates in one direction is larger than the maximum angle the mirror plate can rotate in the opposite direction, as shown in FIG. 4*c*. With is configuration, separation of the reflected light cones from the mirror plate at the ON and OFF states, thus the contrast ratio of the display system can be improved, as described in U.S. patent application Ser. No. 10/366,296 to Patel, filed Feb. 12, 2003, the subject matter being incorporated herein by reference.

Referring to FIG. 4*c*, rotation axis 220 of the mirror plate is located within the same plane of the mirror plate when the mirror plate is not deflected, but offset from the center of the mirror plate. When the mirror plate is deflected, such rotation axis may be displaced off the plane of the mirror plate. With such configuration, the mirror plate can rotate to an ON state angle of 12° degrees or higher, or 14° degrees or higher, or 16° degrees or higher in one direction.

In the above example, each micromirror device has a single addressing electrode for addressing and deflecting the reflective deflectable mirror plate of the micromirror device; and such addressing electrode is positioned within the frame of the micromirror device. Alternatively, more than one electrode can be provided for addressing and deflecting the mirror plate. Specifically, an addressing electrode can be provided for addressing and deflecting the mirror plate to the ON state, and an OFF state electrode for deflecting the mirror plate to the OFF state can be both provided for the same mirror plate of a micromirror device.

For effectively deflecting the mirror plate, the addressing electrode (and/or the OFF state electrode if provided) is preferably positioned offset from the mirror plate. Specifically, a virtual line connecting the geometric center of the addressing electrode and the geometric center of the mirror plate is not perpendicular to the surface of the mirror plate at a non-deflected state. Or such virtual line presents an angle to the surface of the addressing electrode (or the substrate on which the addressing electrode is positioned). The addressing electrode can further be positioned such that the addressing electrode has a portion extending beyond the furthest point of the addressing electrode from its geometric center, as set forth in US paten application "Micromirror Having Offset Addressing Electrode" to Patel, which claims priority from U.S. provisional application Ser. No. 60/582, 446 filed on Jun. 23, 2004, the subject matter of each being incorporated herein by reference.

In accordance with an embodiment of the invention, each micromirror has four predominant sides (more preferably square), such as rectangle, square, rhombus or trapezoid. A four sided micromirror aids in "tiling" the mirrors together so as to minimize gaps and other non-reflective areas. The four predominant sides can define two diagonals. A line between the centers of any two of the plurality of posts is not coincident with either of the two diagonals. Whether the micromirror is a rectangle, square, rhombus or trapezoid, even if the corners are rounded or "clipped" or if an aperture or protrusion is located on one or more of the sides of the micromirror, it is still possible to conceptually connect the four major sides of the micromirror shape and take a diagonal across the middle of the micromirror. In this way, a center diagonal can be defined even if the micromirror plate is substantially a rhombus, trapezoid, rectangle, and square.

Figure 5A:
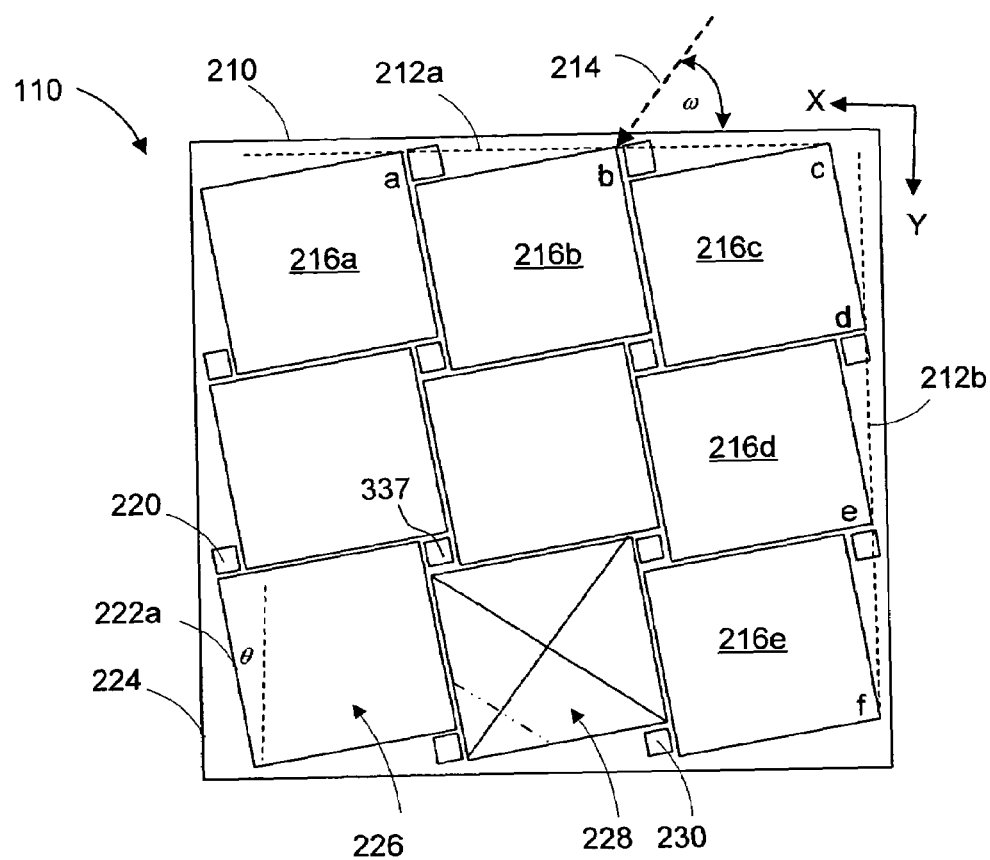
FIGS. 5a and 5b present a top view of a portion of the micromirror array in the spatial light modulator of FIG. 3.

As a way of example, FIG. 5*a* illustrates a top view of a portion of an array of micromirrors according to an embodiment of the invention. To better illustrate the geometric arrangement, each mirror plate of the micromirror in the micromirror array is represented by a simple square with detailed structures, such as hinge, of the mirror plates being removed. It can be seen from the figure that each mirror plate (e.g. mirror plate 228) has four predominant sides and is held by posts 218 and 230. A four sided mirror plate is advantageous in for example "tiling" the mirror plates of the micromirrors in the array together so as to minimize gaps and other non-reflective areas therebetween. The four predominant sides define two diagonals, such as the diagonals plotted in solid lines in micromirror 228. A line between the centers of any two of the plurality of posts, such as a line between the centers of posts 218 and 230 in micromirror 228 is not coincident with either of the two diagonals. This is due to the fact that the posts that hingedly support the mirror plates are not at the direct corners of the micromirrors. By having the micromirrors "skewed" such that the posts are not at the direct corners of the mirror plats, both the mirror plates and posts can be "tiled" with maximum effect (minimizing non-reflecting areas). Of course, the posts can be positioned at the corners, such as in a way such that the line connecting the centers of the posts is coincide with a diagonal of the mirror plate.

Figure 5B:
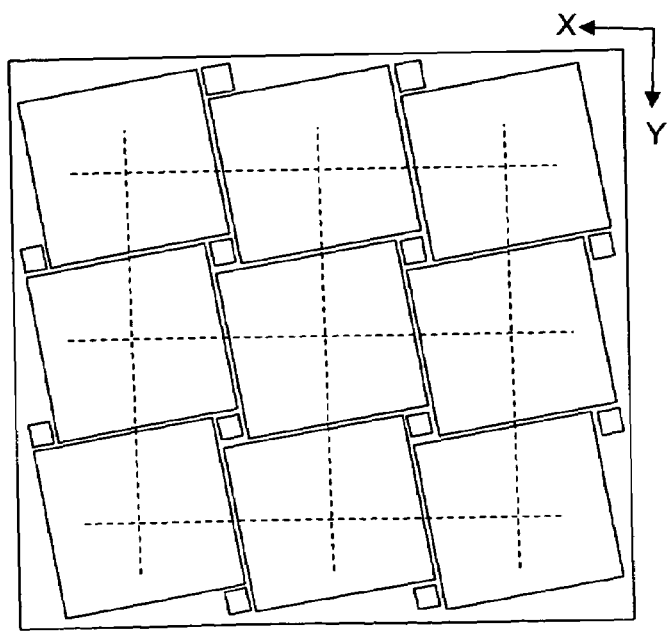

In another way of describing this arrangement of the invention, the centers of the micromirrors in each row (the micromirrors disposed along the X-direction) are connected with an imaginary line, and the imaginary lines for all rows form a set of parallel imaginary lines along the X-direction, as shown in FIG. 5*b*. The centers of the micromirrors in each column (the micromirrors disposed along the Y-direction) are connected with another imaginary line, and all such imaginary lines form sets of parallel imaginary lines along the Y-direction. The imaginary lines along the X-direction are orthogonal to the imaginary lines along the Y-direction, and all imaginary lines form an orthogonal grid. Each one of the four predominant edges of each micromirror, however, is not parallel to an imaginary line of the grid.

In accordance with another embodiment of the invention, spatial light modulator 110, the micromirror array is rectangular in shape as illustrated in FIGS. 5*a* and 5*b*. By "rectangular micromirror array", it is meant that a line (e.g. dotted line 212*a* in FIG. 5*a*) connecting all equivalent points (e.g. points a, b and c in FIG. 5a) of the micromirrors (e.g. micromirrors 216a, 216b and 216c) along the X direction (e.g. the X-direction in the X–Y Cartesian coordinate system illustrated in FIG. 5a) is perpendicular or substantially perpendicular to a line (e.g. dotted line 212b) connecting all equivalent points (e.g. points d, e and f) of the micromirrors (e.g. micromirrors 216c, 216d and 216e) along the Y direction of the X–Y Cartesian coordinate system. Each micromirror has four predominant sides, wherein each side is neither parallel nor perpendicular to the edges of the rectangular micromirror array. For example, edge 222a of micromirror 226 has an angle θ with the edge (e.g. the edge represented by dotted lines 212b) of the micromirror array, wherein the angle θ is neither 0° nor (n·90)° (n is an integer number) degrees. In the present invention, the angle θ can be an angle from 2° to 30°, though more likely within the range of from 5° to 250 degrees, (e.g. from 10° to 20° degrees, or around 15° degrees).

Angle θ relates to the ratio of the width of the mirror plate to the width of the post. For example, assuming both of the post and mirror plate are square, angle θ can then be written as: $ctg\theta = (m/p - 1)$, wherein m is the width of the mirror plate and p is the width of the post. Corresponding to the preferred range of angle θ from 2° to 30°, the ratio of m/p ranges from 0.7 to 27.6.

In accordance with the invention, spatial light modulator 110 having the micromirror array is used in a display system (e.g. display system in FIG. 1 or FIG. 2) for modulating the light beam from the light source. Incident light beam 214 has an angle φ relative to the micromirror array plane, and the angle between the projection of the incident light on the micromirror array plane and the edge (e.g. edge 210) of the micromirror array is represented by ω, as shown in the figure. The incident angle φ is preferably from 50° to 70° degrees. Angle ω relative to edge 210 of the micromirror array is preferably from 500 to 65° degrees.

Figure 5C:
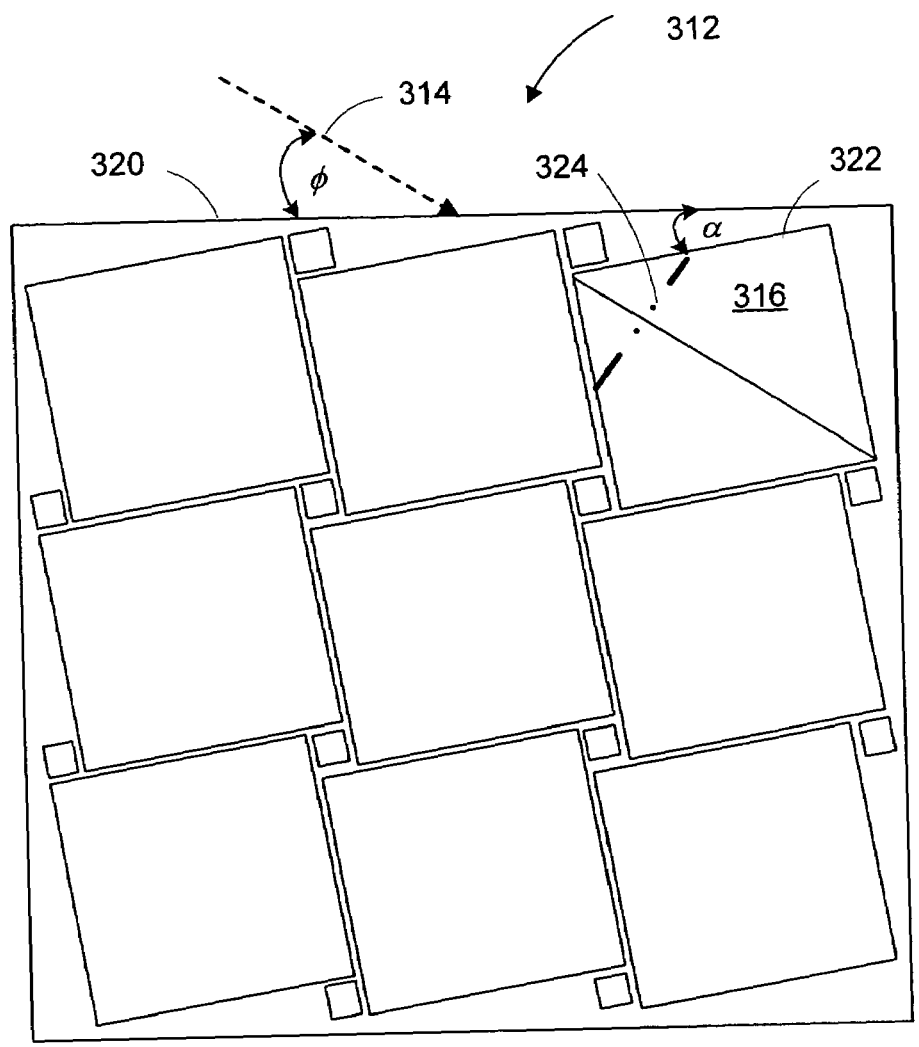
FIG. 5c presents a top view of a portion of another exemplary micromirror array in the spatial light modulator of FIG. 3.
Figure 5D:
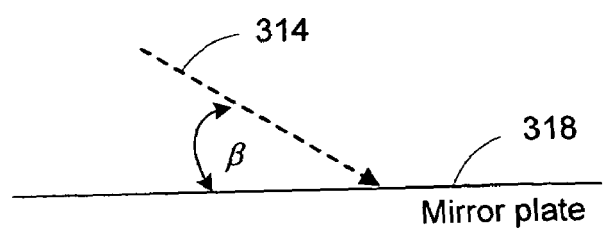
FIG. 5d illustrates the angle between the illumination light and the reflecting surface of the mirror plate in FIG. 5c.

FIG. 5c illustrates another exemplary micromirror array that can be used for the spatial light modulator in the display systems, as those shown in FIGS. 1 and 2. Each micromirror of the micromirror array is tilted along an axis passing through its geometric center and perpendicular to the reflecting surface of the mirror plate, resulting in angle α between an edge of the mirror plate and the edge of the micromirror array, such as angle α between mirror plate edge 322 and edge 320 of the micromirror array. In operation, illumination light 314 is directed along the diagonal of the mirror plate, presenting angle φ between the edge (e.g. edge 320) of the micromirror array and the projection of the incident light on the reflecting surface of the mirror plate. Angle β between the illumination light and the reflecting surface (e.g. reflecting surface 318) of the mirror plate is illustrated in FIG. 5d.

As a way of example, angle α can be from 5° to 30° degrees, such as from 10° degrees to 20° degrees, preferably around 12° degrees. Angle β can be from 20° to 50° degrees, preferably around 33° degrees. Angle β is preferably determined upon the ON state angle $\theta_{ON}$ of the mirror plate in operation, which is preferably equal to $(90° - 2 \times \theta_{ON})$. For example, when $\theta_{ON}$ is 16° degrees, angle β is preferably 58° degrees.

Figure 6:
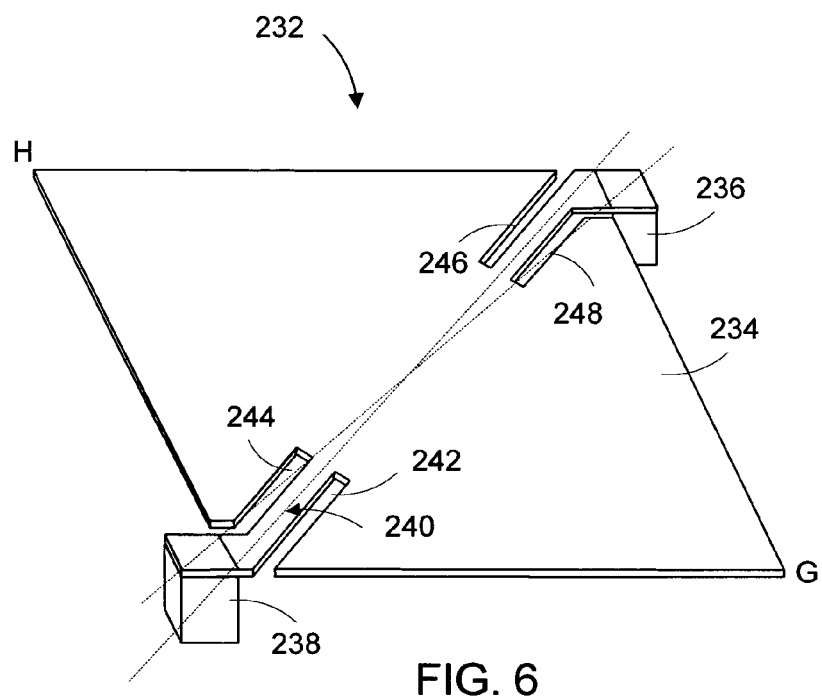
FIG. 6 illustrates a perspective view of an exemplary micromirror according to an embodiment of the invention.
Figure 7:
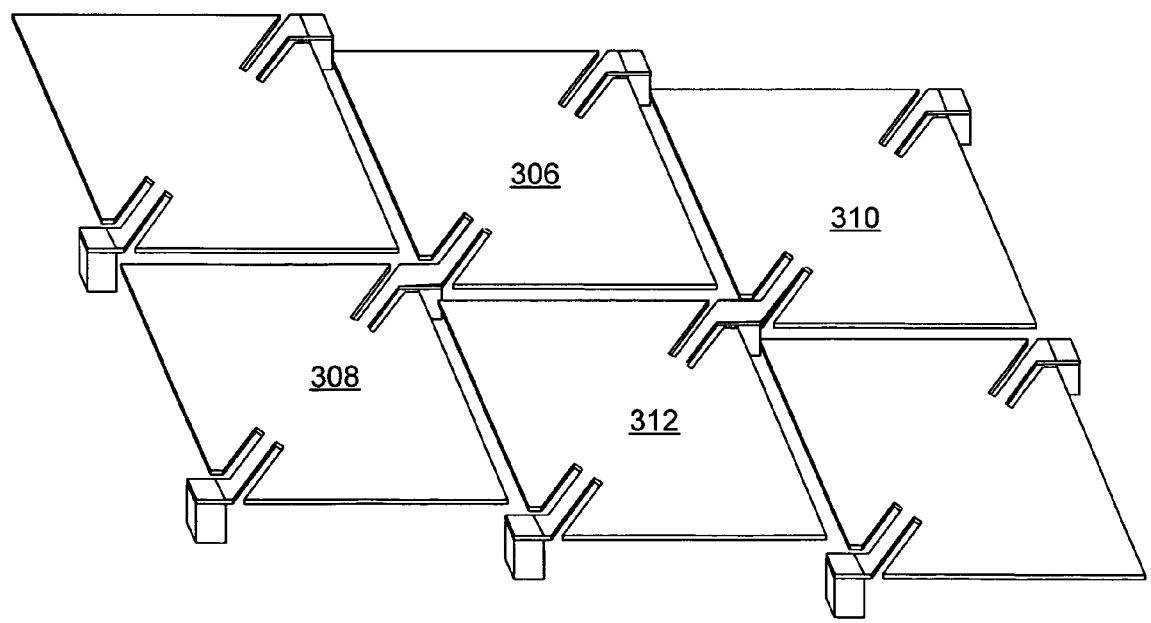
FIG. 7 illustrates a perspective view of a portion of an array of micromirrors of FIG. 6.

As an aspect of the embodiment, each micromirror has an axis of rotation, wherein a virtual line drawn between the two posts provided for holding the micromirror is not parallel to the axis of rotation. FIG. 6 illustrates in greater detail a perspective view from the top of an exemplary micromirror. Referring to FIG. 6, micromirror 232 comprises reflective and deflectable mirror plate 234, deformable hinge 240, and non-deformable posts 236.

The deformable hinge is located in the same plane of the mirror plate, and is defined by gaps 240, 244, 246, and 248. The length of the deformable hinge can be along a diagonal of the mirror plate. The mirror plate preferably has a profile that is predominantly square. And the size of the mirror plate is preferably 20 microns or less, such as 15 microns or less, 13.5 microns or less, or 10 microns or less. The thickness of the mirror plate is preferably 2 microns or less, such as 1 micron or less, or 0.5 microns or less, or more preferably 0.3 microns or less. The hinge may have the same thickness as the mirror plate. And the width (the dimension of the cross section perpendicular to the length) of thee hinge is preferably 1 microns or less, such as 0.7 microns or less, 0.5 microns or less, or even 0.25 microns or less.

Posts 236 and 238 are connected to the deformable hinge with each being positioned at an end of the deformable hinge along the length. However, the posts are positioned such that the virtual line connecting the centers of the posts is not parallel to the rotation axis, or is not parallel to the length of the hinge as shown in the figure. Instead, the posts are disposed along and aligned to the opposite edges of the mirror plate. This configurations conforms with the description in FIG. 5a.

For deflecting the mirror plate, an addressing electrode can be placed proximate to the mirror plate such that an electrostatic field can be established between the mirror plate and addressing electrode. The height of the posts, which defines the vertical distance between the mirror plate and the addressing electrode, is determined according to the desired strength of electrostatic force sufficient for rotating the mirror plate to the ON and OFF states. The desired electrostatic force is derived from an electrostatic field established between the mirror plate and the associated addressing electrode. In response to such electrostatic force, the mirror plate rotates above the addressing electrode. Specifically, mirror plate portion with tip G rotates towards the addressing electrode, while mirror plate portion with tip H rotates away from the addressing electrode. During the course of rotation, the hinge deforms and accumulates deformation. Such deformation in turn generates a restoration torque resisting the rotation of the mirror plate. Because the strength of the restoration torque is not sufficient enough to balance the torque of the electrostatic force, the mirror plate continues its rotation to the desire angle, such as the ON state angle.

The rotation of the mirror plate at the desired angle (the ON state angle) can be stopped by stopping mechanisms. The stopping mechanisms can be the addressing electrode substrate having the addressing electrode or additional stopping structures that can be disposed on the addressing electrode substrate. For example, a stopper in the form of protrusion pointing towards the mirror plate can be formed on the addressing electrode substrate.

When the mirror plate is desired to depart from the ON state for the OFF state, the strength of the applied electrostatic field, thus the strength of the electrostatic force derived thereof, is reduced (e.g. to zero). The restoration force of the deformation torque overcomes the torque of the electrostatic force, resulting in departure of the mirror plate from the OFF state.

A micromirror array having the micromirror in FIG. 6 is illustrated in 7. For simplicity purposes, only 2×3 micromirrors are presented. The adjacent micromirrors may use the same post, such as the shared posts for micromirrors 306, 308, 310, and 312, by which the deformable hinges of the micromirrors can be connected together. One advantage of such configuration is simplification of applying voltages to the mirror plates of the micromirrors across the micromirror array, (or maintaining the mirror plates of the micromirrors at the same electrical potential.

Figure 8:
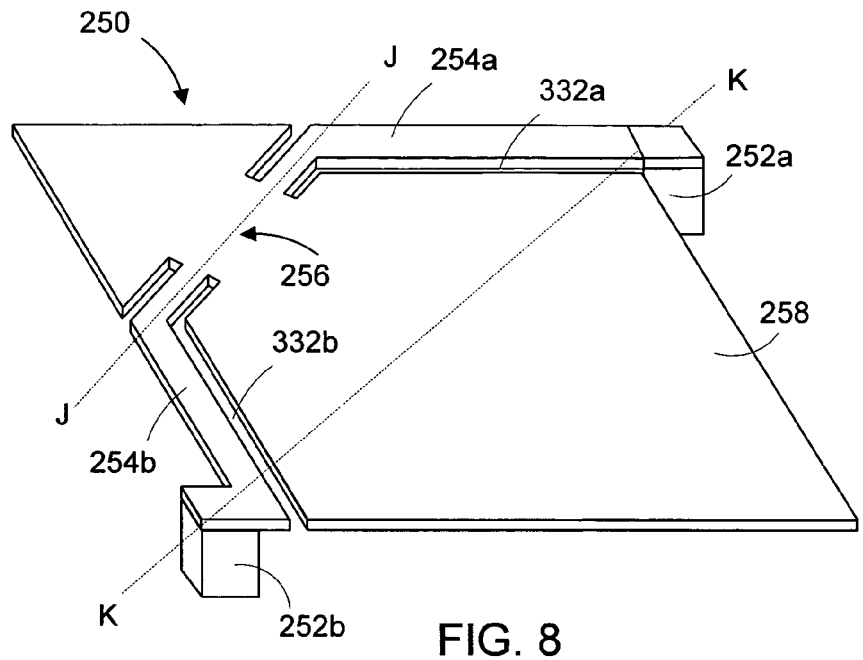
FIG. 8 illustrates a perspective view of another exemplary micromirror according to another embodiment of the invention.
Figure 9:
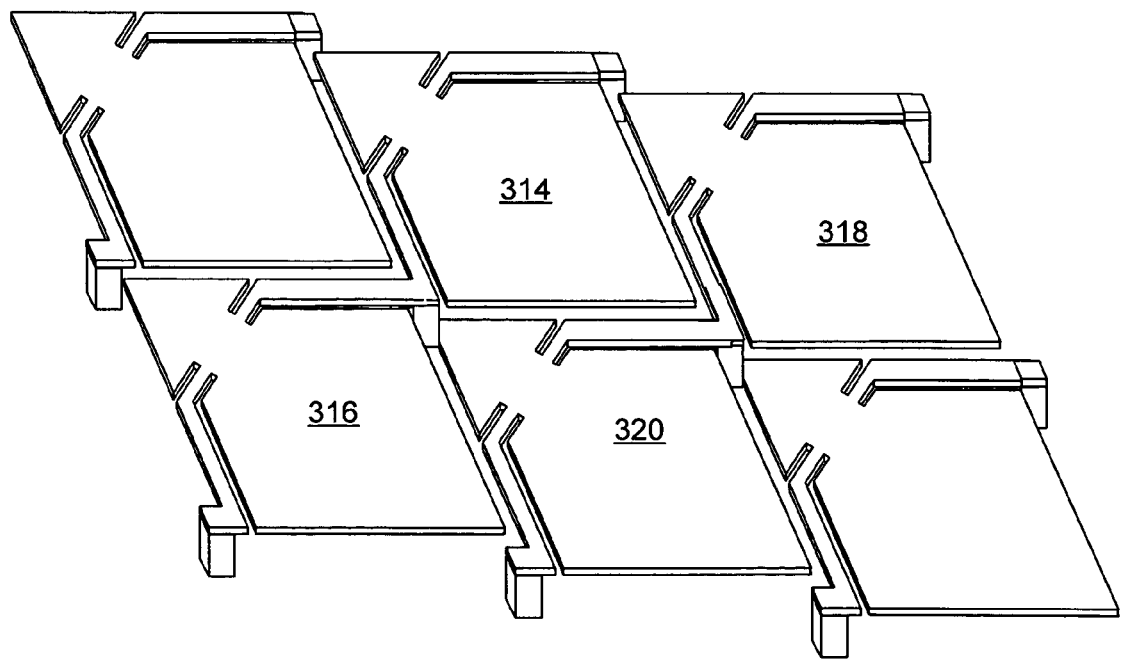
FIG. 9 illustrates a perspective view of a portion of an array of micromirrors of FIG. 8.

Another exemplary micromirror according to an embodiment of the invention is illustrated in FIG. 8. Referring to FIG. 8, micromirror 250 comprises deformable hinge 256 whose length is along a direction JJ that is parallel to but offset from diagonal of the mirror plate. In an alternative embodiment, the deformable hinge can be made not parallel to but offset from a diagonal of the mirror plate, which will not be discussed in detailed herein. However, line KK connecting posts 252a and 252b is not parallel to the hinge (line JJ) or the rotation axis of the mirror plate.

The deformable hinge is defined by the gaps within the mirror plate. The posts are positioned along the edges of the mirror plate. The deformable hinge is connected to the posts through hinge supports 254a and 254b that are respectively defined by gaps 332a and 332b within the mirror plate, as shown in the figure. Because the gaps 332a and 332b are made within the mirror plate, the hinge supports 254a and 154b in combination of the deformable hinge, the gap defining the deformable hinge, and the reflective area of the mirror plate together take a shape of substantially square.

Because the hinge is offset from a diagonal of the mirror plate (but not at an edge of the mirror plate), the rotation axis is also offset from a diagonal of the mirror plate. With such configuration, the mirror plate rotates asymmetrically. That is, the maximum angle (e.g. the ON state angle) achievable by the mirror plate rotating in one direction is larger than the maximum angle (e.g. the OFF state angle) in the opposite direction. An advantage of such asymmetrical rotation is improved contrast ratio.

A micromirror array having the micromirror in FIG. 8 is illustrated in 9. For simplicity purposes, only 2×3 micromirrors are presented. The adjacent micromirrors may use the same post, such as the shared posts for micromirrors 314, 316, 318, and 320, by which the deformable hinges of the micromirrors can be connected together. One advantage of such configuration is simplification of applying voltages to the mirror plates of the micromirrors across the micromirror array, (or maintaining the mirror plates of the micromirrors at the same electrical potential.

Figure 10:
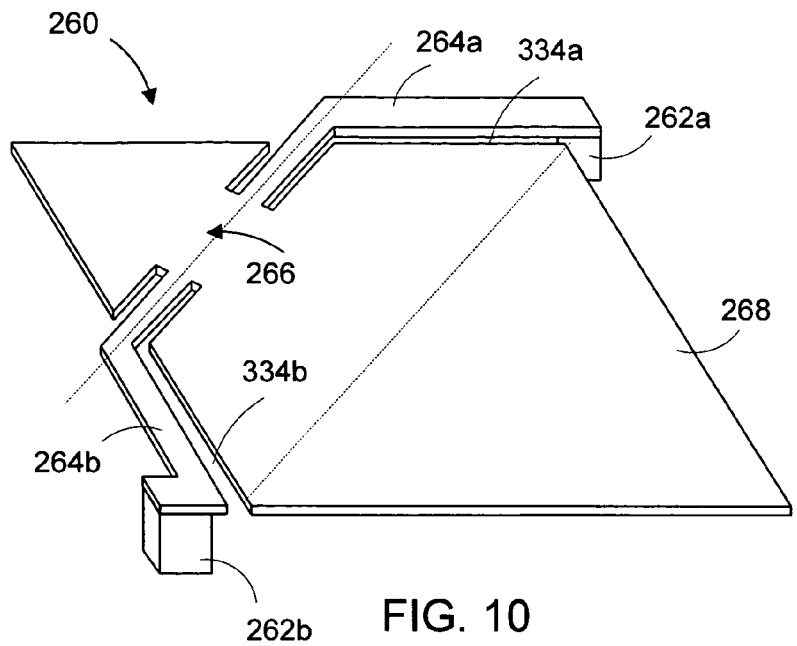
FIG. 10 illustrates a perspective view of yet another exemplary micromirror according to yet another embodiment of the invention.
Figure 11:
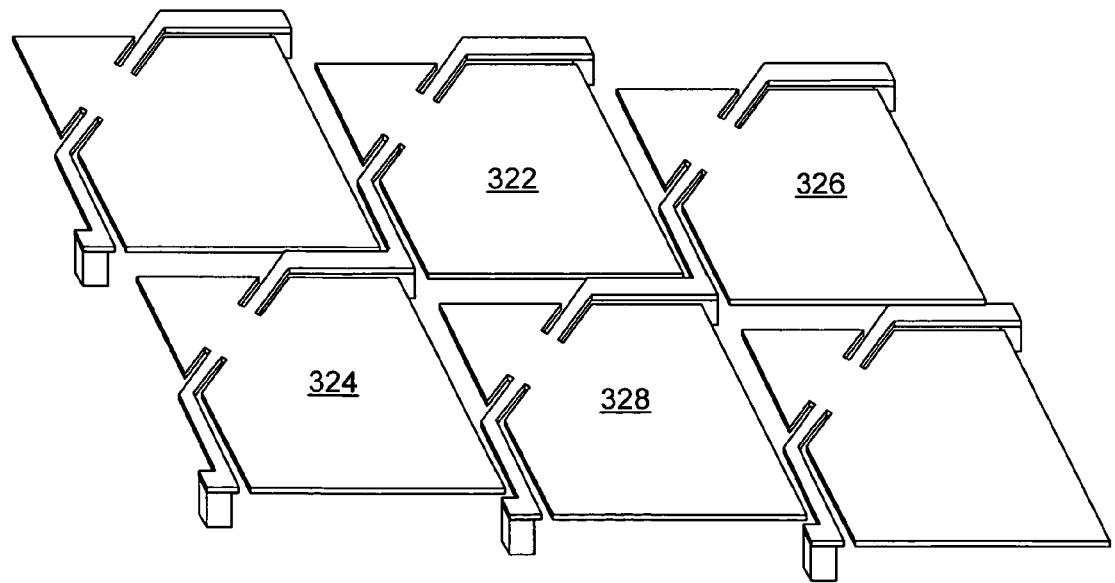
FIG. 11 illustrates a perspective view of a portion of an array of micromirrors of FIG. 10.

A variation to micromirror in FIG. 8 is illustrated in FIG. 10. Referring to FIG. 10, different from micromirror 250 in FIG. 8, micromirror 260 in FIG. 10 comprises hinge supports 264a and 264b that are extended beyond mirror plate 268. Space 334a and 334b between the mirror plate and hinge supports 264a and 264b, respectively, are not gaps made within the mirror plate, as gaps 332a and 332b in mirror plate 258 in FIG. 8. Formation of spaces 334a and 334b will be described with reference to FIG. 12 wherein an exemplary fabrication process is illustrated.

Micromirror 260 in this example comprises mirror plate 268, deformable hinge 266, posts 262a and 262b. The deformable hinge is defined by gaps within the mirror plate. The two ends at the length of the deformable hinge are connected to hinge supports 264a and 264b. The hinge supports are respectively connected to and thus held by posts 262a and 262b.

A micromirror array having the micromirror in FIG. 10 is illustrated in 11. For simplicity purposes, only 2×3 micromirrors are presented. The adjacent micromirrors may use the same post, such as the shared posts for micromirrors 322, 324, 326, and 328, by which the deformable hinges of the micromirrors can be connected together. One advantage of such configuration is simplification of applying voltages to the mirror plates of the micromirrors across the micromirror array, (or maintaining the mirror plates of the micromirrors at the same electrical potential.

In operation, it is advantageous to direct the illumination light onto the reflecting surface of the mirror plate with its projection on the reflecting surface along a diagonal of the mirror plate, as shown in FIG. 5a and FIG. 5c so as to reduce undesired light scattering from the mirror plate edges. However, the gaps in the reflective mirror plate may introduce additional undesired light scattering, which can be maximized when the length of the gap is perpendicular to the incident light. For this reason, the gaps can be made such that the lengths of the gaps are not perpendicular to the incident light. The undesired light scattering can be further reduced by properly reducing the dimension (e.g. the widths) of the gaps. The reduced dimensions of the gaps, however do not match the optical properties of the incident light which may produce other additional artifacts, for example, diffraction pattern. For example, when the dimensions of each pair of substantially parallel gaps are comparable to (e.g. equal to or less than) the wavelength of the incident light, diffraction pattern may be produced on the display target. Such diffraction pattern will be superpositioned with the desired image on the display target, and thus distorting the displayed desired image. This diffraction can be avoided by selecting the dimensions of the gaps not matching the wavelength of the incident light.

Figure 12:
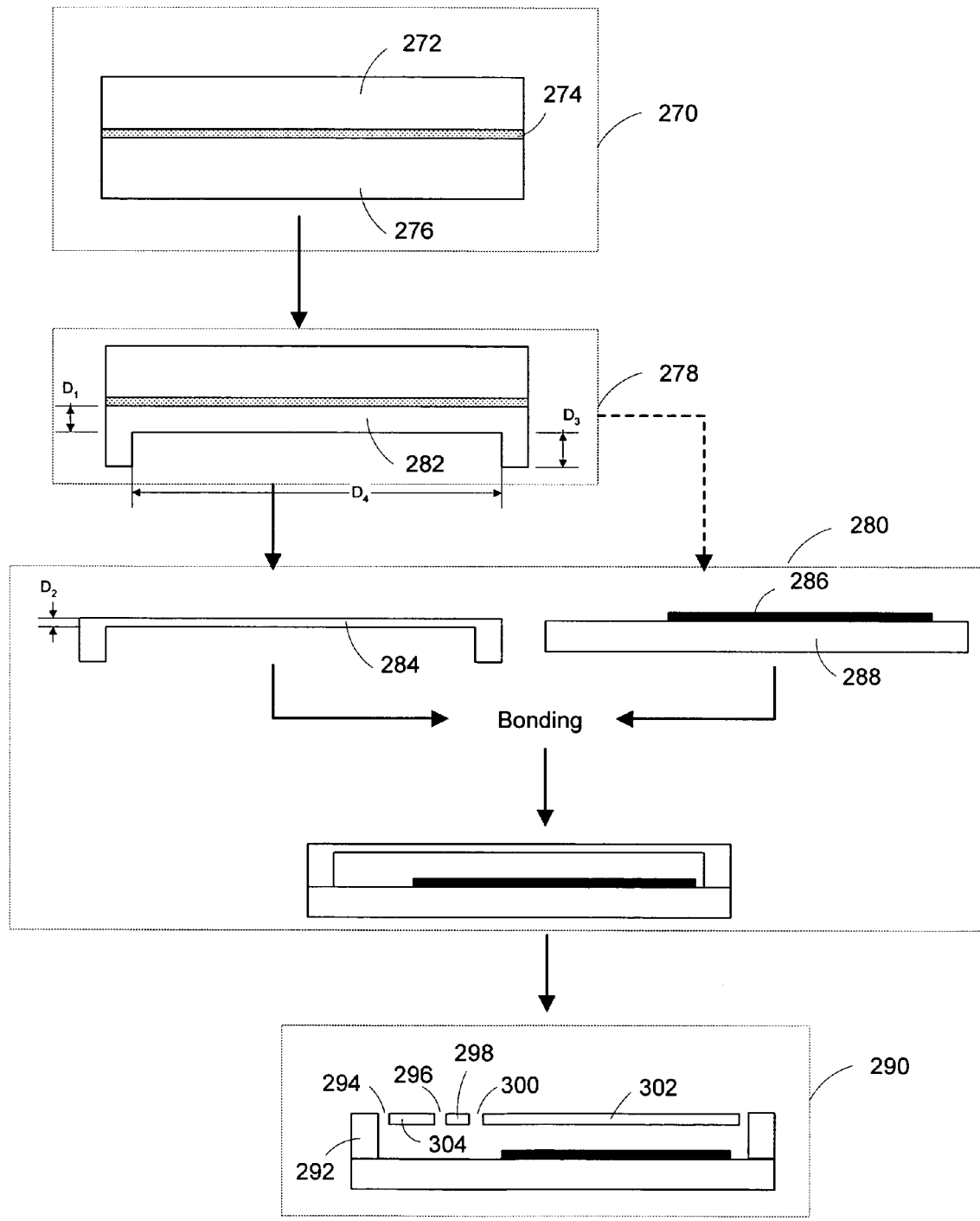
FIG. 12 is a flow chart of an exemplary fabrication process for making the micromirror according to the invention.

The micromirror device as discussed above can be fabricated in many ways. As a way of example, FIG. 12 illustrates a flow chart having steps executed for making the micromirror device. Referring to FIG. 12, mirror substrate 276 is provided (step 260). Because the reflective deflectable mirror plate and the deformable hinge of the micromirror will be fabricated from such mirror substrate, such mirror plate is desired to be rigid and have low creep rate. The mirror substrate can be a single crystal silicon.

For securely handling the mirror plate during the fabrication, handling substrate 272 is provided and attached to the mirror substrate. The handling substrate will be removed later at step 280, for example, using physical techniques, such as grinding and polishing, or chemical techniques, such as etching, or a combination thereof. The chemical etching method can be any suitable etching method as long as the mirror substrate will not be damaged, such as energized etching (e.g. plasma, ion etching, wet or dry etching) or non-energized etching (e.g. etching with spontaneous etchants) depending upon the material of the handling substrate.

For simplifying the following removal of the handling substrate, protection layer 274 is disposed between the mirror substrate and handling substrate by depositing the protection layer before forming the handling substrate on the mirror substrate. The protection layer can be composed of an oxide material, such as silicon oxide, or other suitable materials, such as nitrides (e.g. $TiN_x$ and $SiN_x$).

The mirror substrate is then patterned to create a cavity in the bottom surface of the mirror substrate, as shown in step 278. Standard techniques, such as photolithography can be used to form such cavity. The cavity leaves a frame having a frame wall with a height $D_3$. The frame wall will be patterned into posts afterwards. Since the distance between the mirror plate and the associated addressing electrode will be maintained by the posts, the height of the frame wall in this place is determined according to the desired strength of the electrostatic force. In accordance with an embodiment of the invention, the frame wall has a height $D_3$ of 6 microns or less, such as 5 microns or less, or 4.5 microns or less, or 3.5 microns or less. The length of the cavity $D_4$ is made according to the desired size of the mirror plate and the cross-dimension of the gaps. Exemplary length of $D_4$ can be approximately 14 microns or less, such as 13.8 microns or less, or 13 microns or less. Alternatively, length $D_4$ can be determined according to the desired geometric dimensions of the micromirror array, such as the pitch size (which can be 10.16 micrometers or less or from 4.38 to 10.16 micrometers) and the gap size between adjacent mirrors (which can be 0.5 micrometers or less, or from 0.1 to 0.5 micrometers) as discussed earlier.

After the formation of the cavity, handling substrate 272 and protection layer 274 are removed using a suitable method as discussed earlier. The top surface of the mirror substrate is then thinned so as to form the deflectable and reflective mirror plate and deformable hinge (step 248). This surface thinning step can be performed by etching, and more preferably by grinding or polishing to obtain an even top surface. The resulted top surface has a thickness $D_2$, which is smaller than the thickness $D_1$ of the top surface as show in step 278, and is the desired thickness of the mirror plate. As a way of example, $D_1$ can be from 0.1 to 0.45 microns, such as from 0.2 to 0.35 microns, or around 0.25 microns.

The thinned mirror substrate 284 with cavity formed therein is then bonded to addressing electrode substrate 288 having addressing electrode 286 and circuitry (not shown for simplicity) thereon (step 280) to form an assembly using preferably a low temperature bonding technique, such as eutectic bonding, as set forth U.S. patent application Ser. No. 10/869,539, filed Jun. 15, 2004, wherein a low temperature bonding method is employed to bond two substrates respectively having micromirrors and addressing electrodes thereon, the subject matter being incorporated herein by reference. In performing the bonding, the two substrates may be required to be aligned together. Such alignment can be performed in the aid of holes made in the substrates. For example, a hole through one or both of the silicon substrates can be made with deep silicon etch (e.g. STS deep silicon etch tool). The two substrates are then optically aligned via the hole.

The thinned mirror substrate and addressing electrode substrate can also be bonded using other bonding methods adopted from methods for bonding two substrates having micromirrors and addressing electrodes, as set forth in U.S. patent application Ser. No. 10/852,981 filed May 24, 2004, the subject matter being incorporated herein by reference. In performing the bonding, the two substrates may be required to be aligned together. Such alignment can be performed in the aid of holes made in the substrates. For example, a hole through one or both of the silicon substrates can be made with deep silicon etch (e.g. STS deep silicon etch tool). The two substrates are then optically aligned via the hole.

The top surface of the mirror substrate in the bonded assembly is then patterned to form the deformable hinge, mirror plate (step 290) and other desired features, such as hinge support as appropriate (e.g. hinge support 254a and 254b in FIG. 8) using for example, standard lithography technique followed by an etching process, such as a plasma etching (e.g. a reactive-ion-etching). For example, gaps 240, 242, 244, and 246 in FIG. 6 for micromirror 232 are made according to the desired pattern. The gaps results in the desired deformable hinge and the mirror plate.

Before, during or even after the step of making gaps within the mirror plate, the frame of surrounding the mirror plate is patterned so as to form the posts of the micromirror. In particular, when micromirror 260 is to be made, gaps defining deformable hinge 266 are made within the mirror plate, but hinge support 264a and 264b are formed by patterning the frame of the micromirror.

Figure 13:
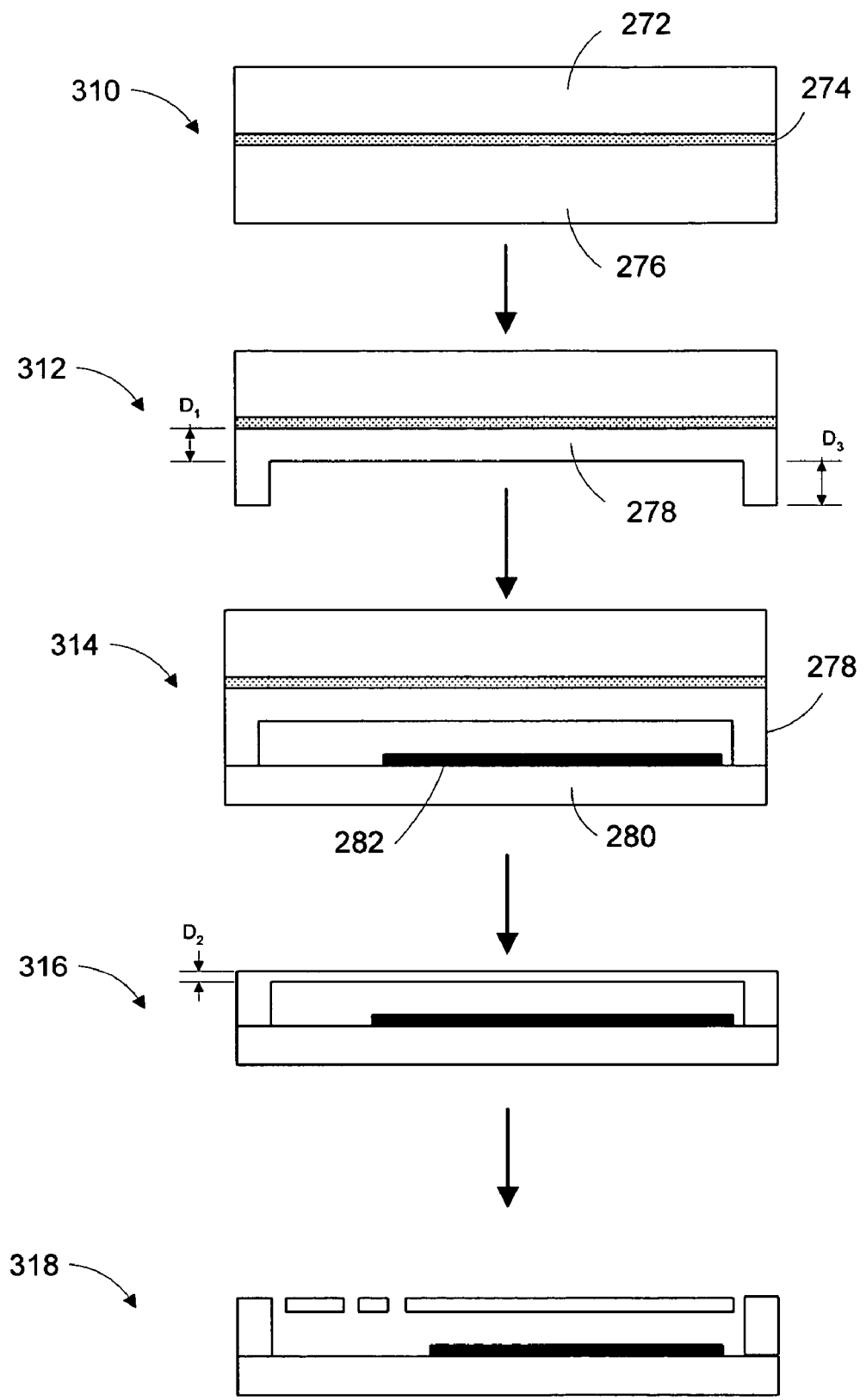
FIG. 13 is a flow chart of another exemplary fabrication process for making the micromirror according to the invention.

Alternative to the fabrication process discussed above wherein the handling substrate (substrate 272) is removed before bonding the thinned mirror substrate to the electrode substrate, the handling substrate can be removed after bonding the mirror plate to the electrode substrate, as illustrated in FIG. 13.

Referring to FIG. 13, handing substrate 272 is bonded to mirror substrate 276 with protection layer 274 disposed in between at step 310. The mirror substrate is then formed therein a cavity at step 312. At step 314, the mirror substrate having the cavity and bonded to the handling substrate is bonded to electrode substrate 280 having addressing electrode 282 formed thereon. After bonding, handling substrate 72 and protection layer 274 are removed from the mirror substrate followed by the thinning process of the mirror substrate at step 316. The thinned mirror substrate is then patterned so as to form the desired mirror plate and deformable hinge.

For improving the performance and reliability of the micromirror device, other techniques may be employed during the fabrication. For example, the top surface (after thinning) of the mirror substrate can be coated with a reflective material, such as aluminum, gold, and silver. When the aluminum layer is to be formed on the thinned top surface of the mirror substrate, the aluminum layer can be formed by sputtering using an Al—Si sputtering target so as to avoid possible diffusion between the deposited aluminum layer on the silicon mirror plate and the silicon mirror plate. The coating can be performed at any step after thinning the top surface of the mirror substrate. Alternatively, a barrier layer can be deposited before depositing the aluminum layer on the reflective surface of the mirror plate to prevent diffusion between aluminum and silicon. Such barrier layer can be $TiN_x$, $SiO_x$, and $SiN_x$, etc.

When an aluminum layer is deposited on the reflecting surface of the mirror plate, the mirror plate may be curved due to the deposited aluminum layer. To stop such curving, another aluminum layer, or a layer of a suitable material having suitable mechanical properties, is deposited on the bottom surface (the opposite surface to the reflecting surface) of the mirror plate to balance the deformation of the aluminum layer on the reflecting surface of the mirror plate. Such additional balancing layer can be deposited as a trip, frame, or grid, or completely covers the underside of the mirror plate.

The deformable hinge can also be further processed to improve its reliability and performance. For example, either one or both of the top and bottom surfaces of the deformable hinge can be coated with a layer of $SiN_x$, $TiN_x$, $TiSiN_x$, or SiO to improve its mechanical property. The hinge can also be doped with selected materials, such as boron to improve its mechanical property. The hinge may further have a protection layer deposited thereon for preventing oxidation. Other treatment methods, such as pre-oxidation and pre-straining can be performed for the deformable hinge, as set forth in U.S. patent application Ser. No. 10/766,776, filed Jan. 27, 2004, and Ser. No. 10/823,823 filed Apr. 13, 2004, the subject matter of each being incorporated herein by reference.

For limiting the rotation of the mirror plate when it reaches desired angles (e.g. the ON state angle and OFF state angle), a stopper may be provided. The stopper can be formed on the addressing electrode substrate having addressing electrodes formed thereon, for example, beside the addressing electrode. The stopper can also be formed on the frame holding the mirror plate and hinge. In any situation, the stopper has a contacting surface that contacts the surface of the mirror plate. Such contact may result in stiction when the restoration force in the deformed hinge cannot overcome the adhesion force in presence of the contacting surfaces. In order to prevent such in-use stiction, the micromirror device, especially the contact area, can be lubricated with a lubricant material that coats or physically reacts with the surface molecules of the contact area, as set forth in U.S. patent application Ser. No. 10/810,076, filed Mar. 26, 2003, the subject matter being incorporated herein by reference.

In accordance with the invention, the lubricant can be liquid (or paste) or solid. The lubricant may have a high boiling point (e.g. 100° C. or higher) or low vapor pressure such that the lubricant does not condense at low temperature or fully evaporate at high temperatures (e.g. 30° C. or more or 70° C. or more, or even 100° C. or more) (the high and temperature refer to the storage and operating range of the micromirror device). The lubricant is desired to be stable at a high temperature, such as 200° C. or higher. The viscosity of the lubricant in liquid phase can be of from 1 cP to 500 cP. However, any desired lubricant can be used.

As an example, the lubricant can be a perfluoropolyether with molecular weight of from 500 to 5000. The lubricant can also be a perfluorinated hydrocarbon having 30 carbons or less, such as an alkane, an amine, an alcohol, an ether, atriazine, or a glycols. Other suitable lubricants are also applicable. The lubricant may be mixed with other materials, such as a diluent to form a lubricant solution. The diluent is preferably chemically stable at a temperature of 200° C. or higher. An exemplary diluent is a perfluorinated hydrocarbon having 20 carbons or less.

The spatial light modulator may be operated in an environment having unexpected gases, moisture or particles (e.g. due to package leaks) which may degrade the performance of the spatial light modulator or cause device failure. This problem can be solved by providing a getter (or getters) to the spatial light modulator for absorbing the gases, moisture, and/or the particles in the environment in which the micromirrors of the spatial light modulator are operated.

The lubricant (or the lubricant solution) for lubricating the surfaces of the micromirrors and the getter(s) for absorbing the gases, moisture, and particles can be disposed at any desired location in the spatial light modulator. As an example of the invention, the lubricant and the getter are disposed on the substrate on which the deflectable elements (e.g. the micromirrors of the spatial light modulator) of the micromirrors are formed; and the lubricant material can be disposed on either or both sides of the mirror substrate. The getter material can be deposited on the substrate on which the mirror plates are formed in the same way as the lubricant. Selected getter material (e.g. if in black color) may also be employed for absorbing scattered light from the edges of the micromirror device, in which situation the getter material can be disposed around the periphery of the micromirror or micromirror array.

Because the mirror plate comprises gaps made for defining the deformable hinge in the mirror plate, the gaps is exposed to the illumination light. In operation, the illumination light can travel through the gaps and illuminates the components of the micromirror, such as the surface of the electrode substrate, the electrode, the internal surface of the frame wall, and the top surface of the frame wall, causing unexpected light scattering. This problem can be solved by providing a light absorbing/blocking material to the micromirror, as illustrated in FIG. 14.

Figure 14:
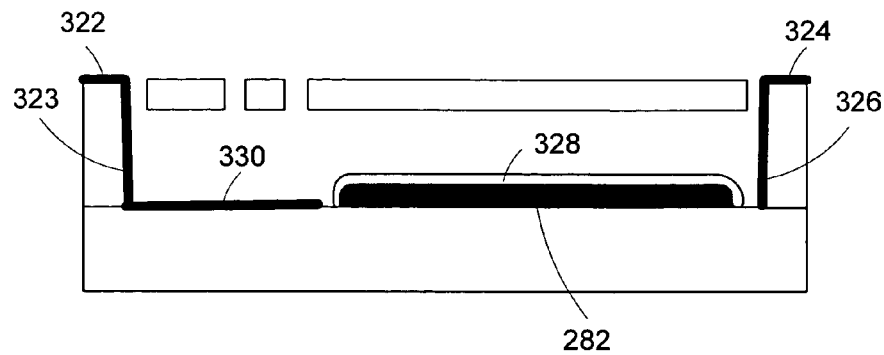
FIG. 14 is a cross-section view of a micromirror device in a package according to an embodiment of the invention.

Referring to FIG. 14, light blocking/absorbing layer 322 can be deposited on the top surface of the frame wall that is exposed to the illumination light. Light absorbing layers 323 and 326 can be deposited on the internal surface of the frame wall so as to absorb illumination light incident thereon. Alternatively, light absorbing layer 330 can be deposited on the areas of the electrode substrate surface not covered by the addressing electrode (addressing electrode 282). For the purpose of preventing or reducing the light scattering from the addressing electrode, the addressing electrode can be coated with light absorbing layer 328.

The light absorbing/blocking layers may comprise any suitable materials. In an embodiment of the invention, the light blocking/absorbing layers are operable to block (or absorb) many wavelengths in the visible spectrum, and are thermal stable. It is preferred that the light blocking (or absorbing) material is capable of blocking (or absorbing) 83% or more, such as 90% or more, 95% or more, and 99% or more of the light incident thereto. For example, the light blocking layer (e.g. layer 322 in FIG. 14) can be ion beam sputtered black chrome or niobium that has a reflectance as low as 3% through the light transmissive substrate. The black chrome coating can be a multilayer structure of chrome and chromium oxide (to match the index of refraction, as in an antireflective coating multilayer film). Of course, other opaque films (preferably those with high optical density, thermally stable and with low reflectivity) can be deposited and patterned (the opacity and color of many films being variable due to deposition parameters).

The light absorbing materials can be black nickel, CrN, TiAlN, TaN, and many films comprising carbon, such as amorphous CN, amorphous CAlN, TiC, TiCN, a-DLC, vitreous carbon, SiC, TiAlCN, WC, etc. Multilayer structures, such as TiC/WC, WC/C or TiAlN/WC/C, can also be used, as well as other multilayer structures with matched indices. Also polyimides and other polymers containing carbon black (or other opacity increasing material) can be used.

When a light absorbing layer (e.g. layer 328 in FIG. 14) is to be coated on the addressing electrode, such layer is preferably non-conductive, such as polyimide with carbon particles (e.g. DARC™ from Brewer Science). Or other dark colored ceramic films such as CrNx, CrOx, TiAlN, TaNx or other films comprising of carbon, such as amorphous CN, amorphous CAlN, TiCN, a-DLC, SiC, TiAlCN, WC, etc. In the alternative, conductive dark films could be used that are placed directly over the addressing electrodes and are electrically connected to the addressing electrodes. Such a film could be a dark metal or metal alloy such as sputtered black chrome or niobium that has a reflectance as low as 3%. The black chrome coating can be a multilayer structure of chrome and chromium oxide (to match the index of refraction, as in an antireflective coating multilayer film). Of course, other opaque films (preferably those with high optical density, thermally stable and with low reflectivity) can be deposited and patterned (the opacity and color of many films being variable due to deposition parameters). Light absorbing conductive materials that can be deposited on the electrodes include black nickel, and films comprising carbon, such as a-DLC or vitreous carbon. It is also possible to deposit a dark electrically conductive grid or matrix surrounding all of the electrodes (without electrically connecting the electrodes).

The light absorbing/blocking layers can be deposited by any suitable film forming methods—such as standard deposition and patterning techniques. For example, the metals and metal alloys can be deposited by sputtering a target in an inert atmosphere. Other techniques, such as electroplating can be used. For ceramic materials, a target can be reactively sputtered—such as in a nitrogen atmosphere to form nitride ceramic films. Or, some films can be deposited by chemical vapor deposition as known in the art. Patterning of the films to form matrices, bands, strips or other designs can be by any suitable etching chemistry—such as by a chlorine (plasma) etch after deposition and patterning of a photoresist. It is also possible to deposit and pattern a photoresist followed by deposition of the light absorbing material.

In addition, the exposed areas of the micromirror device which are not designated for reflecting the incident light are also preferably coated with the light absorbing material as discussed above. For example, the surface exposed to the incident light can be coated with the light absorbing material.

In addition to the light absorbing/blocking layers, an "anti-reflective coating" (an AR film) can also be deposited on the on the electrode substrate, the internal surface of the frame wall, the addressing electrode, the exposed top surface of the frame wall and any other exposed areas other than the reflective surface of the mirror plate in the micromirror. For example a normally absorptive surface (coated with a light absorbing/blocking material) can have enhanced absorption if an "AR film" stack (for example light transmissive dielectric layers), are placed above it so that light reflection is reduced due to destructive interference. Such dielectrics layers can be designed to work particularly well at certain wavelengths and/or angles—and can be used for the matrix or frame on the light transmissive substrate, as will be discussed below.

The light blocking/absorbing layers as discussed above can also be applied to a micromirror array having an array of micromirrors described above, as shown in FIG. 15.

Figure 15:
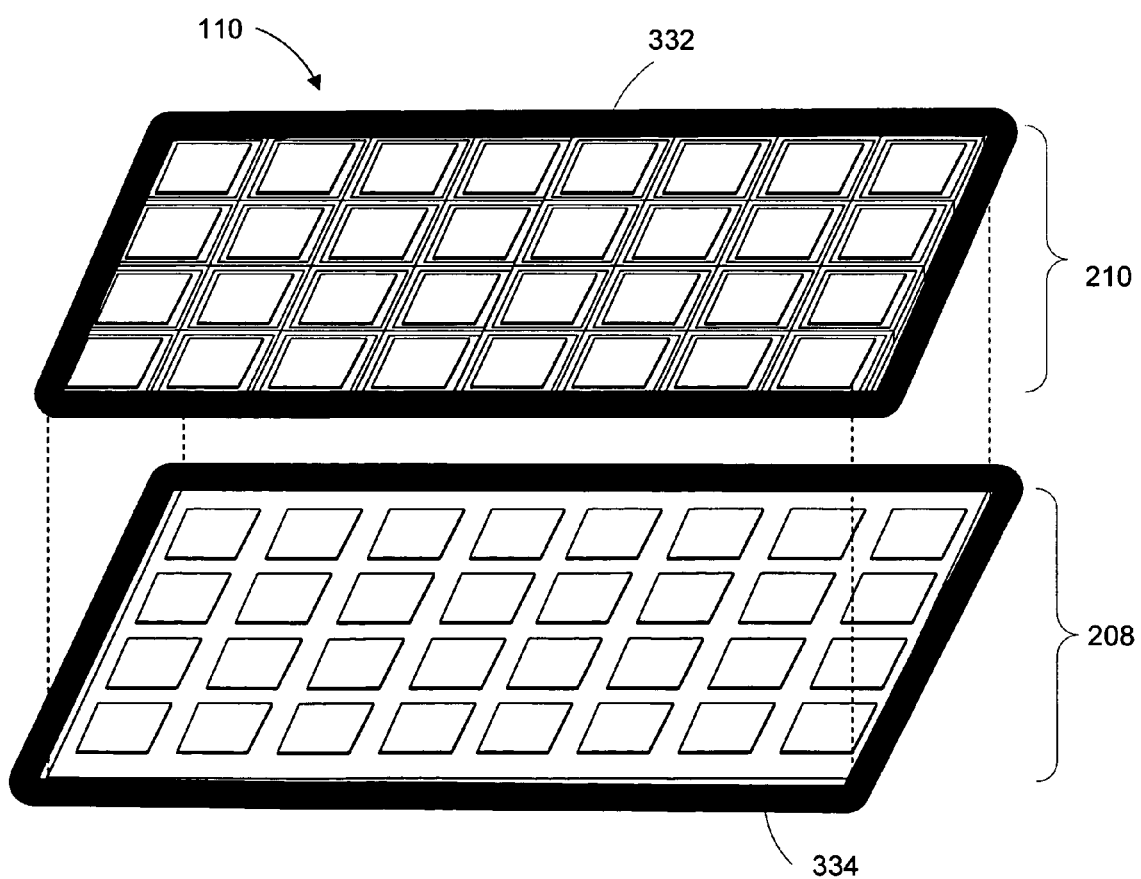
FIG. 15 illustrates micromirror array device having a light absorbing/blocking materials.

Referring to FIG. 15, light blocking/absorbing layer 332 is deposited around the perimeter of mirror substrate 210 having an array of micromirrors. Alternatively, light absorbing/blocking layer 286 can be deposited around the perimeter of electrode substrate 208. Of course, the light absorbing/blocking layers 332 and 334 can be applied individually or in combination. The light absorbing/blocking layers 332 and 334 can alternatively be formed in other suitable forms other than a frame. For example, they can be formed as a grid such that the micromirrors (and/or the addressing electrodes) are located in the nets of the grid and surrounded by the light absorbing/blocking material. The light blocking/absorbing layers can also be formed as strips, segments, and any combination with frames and grids.

It will be appreciated by those skilled in the art that a micromirror device and a method of making the same have been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

We claim:

1. A micromirror device, comprising:
   a substrate;
   a mirror plate;
   a deformable hinge disposed in the same plane as the mirror plate and connected to the mirror plate such that the mirror plate is movable relative to the substrate;
   first and second posts positioned proximate to the mirror plate for holding the mirror plate on the substrate, wherein the first and second posts are disposed such that a line connecting the first and second posts is not coincident with a diagonal of the mirror plate;
   a semiconductor substrate having thereon an addressing electrode for addressing and deflecting the mirror plate, wherein the semiconductor substrate supports the first and second posts; and
   wherein the mirror plate and/or the deformable hinge comprises single crystal silicon.

2. The device of claim 1, wherein the first and second posts are aligned to two opposite edges of the mirror plate.

3. The device of claim 2, wherein the hinge and mirror plate comprise a single crystal silicon.

4. The device of claim 3, wherein the mirror plate and posts are made from the same material.

5. The device of claim 4, wherein said same material from which the post and mirror plate are made is a single crystal silicon.

6. The device of claim 2, wherein each of the first and second posts comprises a major edge that is parallel to the closest edge of the mirror plate.

7. The device of claim 3, wherein the deformable hinge is parallel to a diagonal of the mirror plate.

8. The device of claim 1, wherein the deformable hinge is not parallel to any diagonal of the mirror plate.

9. The device of claim 1, further comprising a set of gaps in the plane of the mirror plate, and wherein one of the set of gaps is not perpendicular to any diagonal of the mirror plate.

10. The device of claim 1, further comprising a set of gaps in the plane of the mirror plate, wherein one of the set of gaps is not perpendicular to an illumination light incident onto the mirror plate.

11. The device of claim 1, wherein the addressing electrode is the single addressing electrode of the micromirror device for addressing and deflecting the mirror plate.

12. The device of claim 11, wherein the addressing electrode is positioned offset from the mirror plate.

13. The device of claim 12, wherein a virtual line connecting a geometric center of the mirror plate and a geometric center of the addressing electrode is not perpendicular to the surface of the mirror plate at a non-deflected state.

14. The device of claim 1, wherein the mirror plate has a thickness from 0.1 to 0.45 microns.

15. The device of claim 1, wherein the thickness is from 0.2 to 0.35 microns.

16. A spatial light modulator device, comprising: an array of micromirror devices of claim 1.

17. The device of claim 16, wherein at least one of the micromirror of the micromirror array has at most one post directly connected thereto.

18. The device of claim 16, wherein at least one of the micromirror of the micromirror array has no post directly connected thereto.

19. The device of claim 16, wherein the top surfaces of at least two adjacent micromirror devices are connected to the semiconductor substrate with the same post.

20. A projection system, comprising:
an illumination system providing illumination light;
a spatial light modulator of claim 16;
an optical element directing the illumination light onto the spatial light modulator where the illumination is modulated;
a display target on which the modulated illumination light is projected so as to produce a desired image.

21. The system of claim 20, wherein the illumination system comprises a light source, a lightpipe, and a color filter.

22. The system of claim 20, wherein the lightpipe is positioned after the light source and color filter at a propagation path of the illumination light.

23. The system of claim 20, wherein the lightpipe is positioned between the light source and color filter.

24. The device of claim 1, wherein the hinge comprises a coating film having a coating material other than the material of the hinge.

25. The device of claim 24, wherein the coating film comprises a light blocking material.

26. The device of claim 24, wherein the coating film comprises a light absorbing material.

27. The device of claim 1, wherein the hinge comprises at least an oxidized portion.

28. The device of claim 1, wherein the hinge comprises at least a nitrided portion.

29. The device of claim 1, wherein the mirror plate comprises a light reflective coating.

30. The device of claim 29, wherein the light reflective coating comprises gold.

31. The device of claim 29, wherein the light reflective coating comprises silver.

32. The device of claim 29, wherein the light reflective coating comprises aluminum.

33. The device of claim 32, wherein the mirror plate further comprises a barrier layer between the mirror plate and aluminum coating.

34. The device of claim 29, wherein the mirror plate further comprises a balancing layer for balancing the reflective coating.

35. The device of claim 34, wherein the balancing layer is disposed on the opposite side of the mirror plate to the reflective coating.

36. The device of claim 1, further comprising a light blocking/absorbing layer on one or both of the first and second posts.

37. The device of claim 1, further comprising a packaging substrate on which the micromirror device is disposed, wherein the package substrate comprises a light absorbing layer.

38. The device of claim 37, further comprising: a package cover bonded to the package substrate with the micromirror disposed therebetween.

* * * * *